United States Patent
Zhang (10) Patent No.: US 9,851,514 B2
(45) Date of Patent: Dec. 26, 2017

(54) APPARATUS FOR COUPLING LASER AND OPTICAL FIBER, AND OPTICAL SIGNAL TRANSMISSION SYSTEM AND TRANSMISSION METHOD

(71) Applicant: Huawei Technologies Co., Ltd., Shenzhen (CN)

(72) Inventor: Can Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/222,462

(22) Filed: Jul. 28, 2016

(65) Prior Publication Data
US 2016/0334589 A1 Nov. 17, 2016

Related U.S. Application Data
(63) Continuation of application No. PCT/CN2014/071752, filed on Jan. 29, 2014.

(51) Int. Cl.
*G02B 6/26* (2006.01)
*G02B 6/42* (2006.01)

(52) U.S. Cl.
CPC ........ *G02B 6/4206* (2013.01); *G02B 6/424* (2013.01); *G02B 6/4214* (2013.01); *G02B 6/4239* (2013.01); *G02B 6/4245* (2013.01)

(58) Field of Classification Search
None
See application file for complete search history.

(56) References Cited

U.S. PATENT DOCUMENTS

| | | | |
|---|---|---|---|
| 3,894,789 A | 7/1975 | Kobayashi et al. | |
| 4,806,996 A | 2/1989 | Luryi | |
| 4,807,954 A * | 2/1989 | Oyamada | G02B 6/262 385/33 |

(Continued)

FOREIGN PATENT DOCUMENTS

| CN | 102044830 A | 5/2011 |
|---|---|---|
| CN | 102590926 A | 7/2012 |

(Continued)

OTHER PUBLICATIONS

Machine Translation and Abstract of Chinese Publication No. CN102044830, May 4, 2011, 6 pages.
Machine Translation and Abstract of Chinese Publication No. CN102590926, Jul. 8, 2012, 6 pages.
Machine Translation and Abstract of Chinese Publication No. CN103424819, Dec. 4, 2013, 6 pages.

(Continued)

*Primary Examiner* — Sung Pak
(74) *Attorney, Agent, or Firm* — Conley Rose, P.C.

(57) ABSTRACT

An apparatus for coupling a laser and an optical fiber and an optical signal transmission system and transmission method where the coupling apparatus is disposed between a laser and an optical fiber, where the coupling apparatus includes an optical signal transmission part whose inner refractive index changes gradually, where a refractive index becomes higher at a position closer to a principal axis of the optical signal transmission part; and the optical signal transmission part may be configured to shape an optical signal incident from the laser (including optical signal convergence or divergence), so that a mode field radius of the adjusted optical signal matches a core radius of the optical fiber, and the adjusted optical signal can be coupled into the optical fiber in high efficiency.

13 Claims, 5 Drawing Sheets

(56) References Cited

U.S. PATENT DOCUMENTS

| | | | | |
|---|---|---|---|---|
| 5,999,673 | A * | 12/1999 | Valentin | G02B 6/2835 385/43 |
| 6,834,071 | B2 * | 12/2004 | Sugiyama | G02B 6/4206 372/108 |
| 8,755,644 | B2 * | 6/2014 | Budd | G02B 6/4206 257/774 |
| 2003/0185269 | A1 * | 10/2003 | Gutin | G02B 6/421 372/108 |
| 2004/0126059 | A1 | 7/2004 | Bhagavatula et al. | |
| 2005/0053346 | A1 | 3/2005 | Deng et al. | |
| 2005/0058399 | A1 * | 3/2005 | Nishizawa | G02B 6/4214 385/39 |
| 2005/0121687 | A1 | 6/2005 | Yamada | |
| 2006/0171631 | A1 | 8/2006 | Deng et al. | |
| 2009/0092358 | A1 | 4/2009 | Watanabe et al. | |
| 2015/0016775 | A1 * | 1/2015 | Ho | G02B 6/32 385/33 |
| 2016/0313515 | A1 * | 10/2016 | Shiraishi | G02B 6/4206 |
| 2017/0075070 | A1 * | 3/2017 | Lohse | G02B 6/30 |

FOREIGN PATENT DOCUMENTS

| | | |
|---|---|---|
| CN | 202995099 U | 6/2013 |
| CN | 103424819 A | 12/2013 |
| JP | S5041559 A | 4/1975 |
| JP | H06194536 A | 7/1994 |
| JP | H0843680 A | 2/1996 |
| JP | H10142446 A | 5/1998 |
| JP | H11237515 A | 8/1999 |
| JP | 2000056181 A | 2/2000 |
| JP | 2005134787 A | 5/2005 |
| JP | 2006512616 A | 4/2006 |
| JP | 2006276736 A | 10/2006 |
| JP | 2007505355 A | 3/2007 |
| JP | 2007293300 A | 11/2007 |
| JP | 2011017928 A | 1/2011 |
| WO | 02052909 A2 | 7/2002 |

OTHER PUBLICATIONS

Machine Translation and Abstract of Chinese Publication No. CN202995099, Jun. 12, 2013, 7 pages.

Machine Translation and Abstract of Japanese Publication No. JPH06194536, Jul. 15, 1994, 13 pages.

Foreign Communication From a Counterpart Application, European Application No. 14881080.7, Extended European Search Report dated Dec. 19, 2016, 7 pages.

Foreign Communication From a Counterpart Application, PCT Application No. PCT/CN2014/071752, English Translation of International Search Report dated Nov. 2, 2014, 3 pages.

Foreign Communication From a Counterpart Application, PCT Application No. PCT/CN2014/071752, English Translation of Written Opinion dated Nov. 2, 2014, 3 pages.

Machine Translation and Abstract of Japanese Publication No. JP2000056181, Feb. 25, 2000, 13 pages.

Machine Translation and Abstract of Japanese Publication No. JP2005134787, May 26, 2005, 24 pages.

Machine Translation and Abstract of Japanese Publication No. JP2006276736, Oct. 12, 2006, 23 pages.

Machine Translation and Abstract of Japanese Publication No. JP2011017928, Jan. 27, 2011, 23 pages.

Machine Translation and Abstract of Japanese Publication No. JPH08043680, Feb. 16, 1996, 13 pages.

Machine Translation and Abstract of Japanese Publication No. JPH10142446, May 29, 1998, 17 pages.

Machine Translation and Abstract of Japanese Publication No. JPH11237515, Aug. 31, 1999, 16 pages.

Foreign Communication From A Counterpart Application, Japanese Application No. 2016-548731, Japanese Office Action dated Sep. 5, 2017, 3 pages.

Foreign Communication From A Counterpart Application, Japanese Application No. 2016-548731, English Translation of Japanese Office Action dated Sep. 5, 2017, 4 pages.

\* cited by examiner

FIG. 8

APPARATUS FOR COUPLING LASER AND OPTICAL FIBER, AND OPTICAL SIGNAL TRANSMISSION SYSTEM AND TRANSMISSION METHOD

CROSS-REFERENCE TO RELATED APPLICATION

This application is a continuation of International Application No. PCT/CN2014/071752, filed on Jan. 29, 2014, which is hereby incorporated by reference in its entirety.

TECHNICAL FIELD

The present disclosure relates to the field of optical signals, and in particular, to an apparatus for coupling a laser and an optical fiber and an optical signal transmission system and transmission method.

BACKGROUND

With development of large-scale integrated circuits, intensity and running speeds of components in the circuits increase rapidly, and a conventional manner of communication based on electrical interconnection encounters a bottleneck. This is because a connection size for electrical interconnection is very small, and consequently, an electrical interconnection delay is greater than a running speed of a component, and normal running of the component is affected. In addition, high component wiring intensity also brings a serious parasitic effect, severe crosstalk, and high power consumption.

Figure 1:
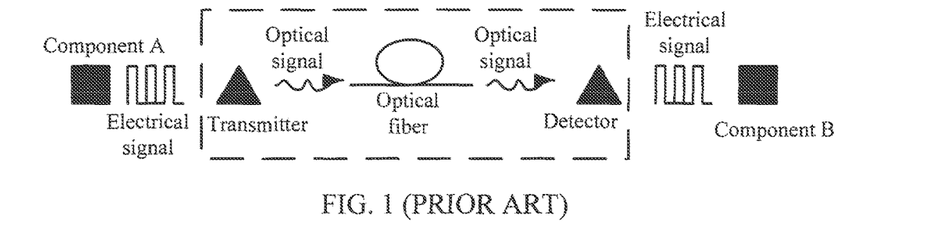
FIG. 1 is a schematic diagram of optical signal transmission based on an optical interconnection technology in the background.

Due to the foregoing deficiencies of electrical interconnection, optical interconnection with its advantages such as a low delay, high electromagnetic compatibility, low power consumption, and high bandwidth, has become a key technology for overcoming the deficiencies of electrical interconnection. As shown in FIG. 1, FIG. 1 is a schematic diagram of typical optical signal transmission based on an optical interconnection technology. It can be seen from FIG. 1 that, for the purpose of transmitting an electrical signal from a component A to a component B, the electrical signal is loaded to an optical wave by means of modulation to form an optical signal, then the formed optical signal is transmitted over an optical fiber, then a detector receives the optical signal and performs operations such as signal conversion and demodulation, and finally the source electrical signal is obtained and transmitted to the component B to complete the entire transmission process.

In the optical signal transmission process shown in FIG. 1, a very important part is a light source used to load the electrical signal. A light source that is used currently is laser light emitted by a laser. A generally used laser includes an edge-emitting laser (for example, a distributed feedback (DFB) laser) and a surface-emitting laser (for example, a vertical-cavity surface-emitting laser (VCSEL)). Compared with the edge-emitting laser, the surface-emitting laser has considerable application scenarios thanks to the following advantages. (1) The surface-emitting laser can be directly modulated, has high modulation efficiency, and requires a low threshold current; (2) temperature drift is slight, and thermoelectric cooling is not required; and (3) an electro-optical conversion rate is high and power consumption is low.

Figure 2:
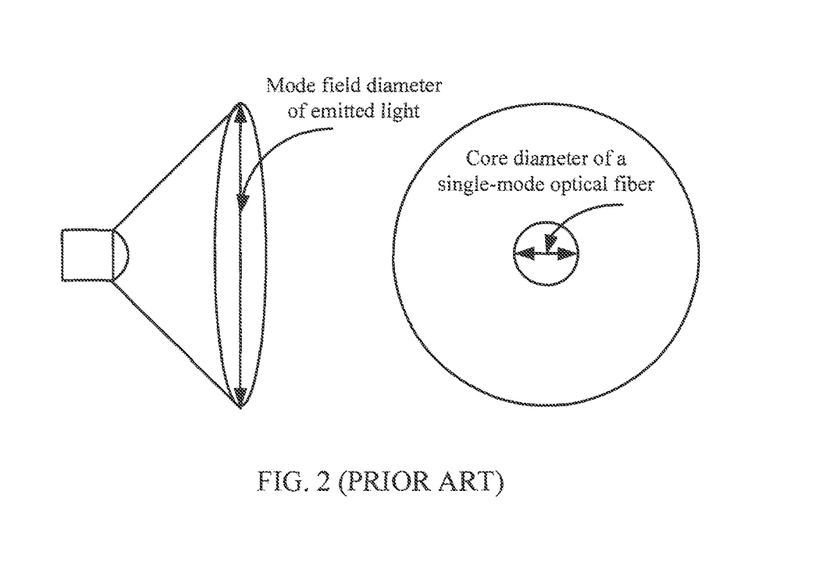
FIG. 2 is a schematic diagram of a mismatch between a mode field of light emitted from a VCSEL and a core diameter of a single-mode optical fiber in the background.

In the optical signal transmission process shown in FIG. 1, light emitted from a laser needs to be coupled into a core of the optical fiber. For example, when the laser that is being used is a VCSEL, and the optical fiber that is being used is a single-mode optical fiber, light emitted from the VCSEL needs to be coupled into a core of the single-mode optical fiber. However, a mode field diameter (MFD), namely a diameter corresponding to a maximum area occupied by a transverse-mode mode field of the optical signal) of the light emitted from the VCSEL is tens to a hundred micrometers (μm) (for example, 50 μm to 100 μm) while a core diameter of the optical fiber is 6 μm to 10 μm. In this case, as shown in FIG. 2, a severe mode field diameter mismatch exists between the VCSEL and the single-mode optical fiber, resulting in a low rate of coupling the light emitted from the VCSEL and the single-mode optical fiber.

In addition to existing between the VCSEL and the single-mode optical fiber, the mode field mismatch problem (including that a mode field diameter of light emitted from a laser is far greater than a core diameter of an optical fiber, or is far less than a core diameter of an optical fiber) may also exist between a laser of another type and a single-mode optical fiber (or a multi-mode optical fiber). Therefore, a proper manner is required to shape an optical signal emitted from the laser, so that a spot diameter of the adjusted optical signal matches a core diameter of an optical fiber, and the optical signal can be coupled into the optical fiber in high efficiency.

SUMMARY

Embodiments of the present disclosure provide an apparatus for coupling a laser and an optical fiber and an optical signal transmission system and transmission method, so as to resolve a problem of a mismatch between a diameter of an optical signal entering an optical fiber and a core diameter of the optical fiber.

According to a first aspect, an apparatus for coupling a laser and an optical fiber is provided, including an optical signal transmission part, where two ends of the optical signal transmission part respectively include a laser fixing part configured to be coupled with a laser and an optical fiber fixing part configured to be coupled with an optical fiber; and a refractive index of the optical signal transmission part changes gradually, the refractive index becomes higher at a position closer to a principal axis, and the optical signal transmission part is configured to converge optical signals incident from the laser coupled to the laser fixing part or diverge an optical signal incident from the laser coupled to the laser fixing part, and then emit a converged optical signal or diverged optical signals into the optical fiber coupled to the optical fiber fixing part.

With reference to the first aspect, in a first possible implementation manner, a difference between a refractive index of an outer surface of the optical fiber fixing part and a refractive index of a cladding used to wrap the optical fiber is less than a threshold.

With reference to the first aspect or the first possible implementation manner of the first aspect, in a second possible implementation manner, the optical signal transmission part includes a first subpart and a second subpart, where the first subpart is wrapped in the second subpart; and a cross-sectional radius of the first subpart changes gradually, and a refractive index becomes higher at a position closer to a center in any cross-section; and a refractive index of the second subpart is constant.

With reference to the second possible implementation manner of the first aspect, in a third possible implementation manner, when the cross-sectional radius of the first subpart decreases gradually in an optical signal transmission direction, the first subpart is configured to perform optical signal convergence; or when the cross-sectional radius of the first subpart increases gradually in an optical signal transmission direction, the first subpart is configured to perform optical signal divergence.

With reference to the third possible implementation manner of the first aspect, in a fourth possible implementation manner, a relationship between a cross-sectional radius, at a position from which an optical signal is emitted, of the first subpart and a mode field radius obtained when the optical signal is emitted from the first subpart is:

$$W^2 = \frac{\sqrt{2}\,a}{k_0 n_1 \sqrt{\Delta}},$$

where α is any cross-sectional radius of the first subpart; W is a mode field radius, in a cross-section corresponding to α, of an optical signal;

$$k_0 = \frac{2\pi}{\lambda_0},$$

where $\lambda_0$ is a wavelength, in vacuum, of a light source used to modulate an optical signal; $n_1$ is a refractive index at a principal axis of the first subpart; and $$\Delta = \frac{n_1^2 - n_2^2}{2n_1^2},$$

where $n_2$ is a refractive index of the second subpart.

With reference to the first aspect or the first possible implementation manner of the first aspect, in a fifth possible implementation manner, the optical signal transmission part includes a third subpart and a fourth subpart, where the fourth subpart is connected to the third subpart at a position, from which an optical signal is emitted, of the third subpart; and a refractive index becomes higher at a position closer to a center in any cross-section of the third subpart, a refractive index of the fourth subpart is constant, and the refractive index of the fourth subpart is equal to and a refractive index at a principal axis of the third subpart.

With reference to the fifth possible implementation manner of the first aspect, in a sixth possible implementation manner, if a length of the third subpart is greater than a threshold, the third subpart is configured to perform optical signal convergence, and a longer length of the third subpart indicates a higher degree of optical signal convergence; or if a length of the third subpart is less than a threshold, the third subpart is configured to perform optical signal divergence, and a shorter length of the third subpart indicates a higher degree of optical signal divergence.

With reference to the sixth possible implementation manner of the first aspect, in a seventh possible implementation manner, a relationship between the length of the third subpart and a mode field radius obtained when an optical signal is emitted from the fourth subpart is:

$$W = \frac{a_0 w_0}{n_2 g \left[\sin^2(gL_1) + \left(\frac{a_0}{n_2 g}\right)^2 \cos^2(gL_1)\right]^{1/2}},$$

where $L_1$ is the length of the third subpart; W is the mode field radius obtained when an optical signal is emitted from the third subpart; $w_0$ is a mode field radius obtained when an optical signal enters the third subpart;

$$a_0 = \frac{\lambda}{\pi w_0^2},$$

where $$\lambda = \frac{\lambda_0}{n_2},$$

$\lambda_0$ is a wavelength, in vacuum, of a light source used to modulate an optical signal, and $n_2$ is the refractive index at the principal axis of the fourth subpart; and g is a focusing parameter.

According to a second aspect, an optical signal transmission system is provided, where the system includes a laser, an optical fiber, and the apparatus for coupling a laser and an optical fiber according to the first aspect or any one of the seven possible implementation manners of the first aspect; the laser and the optical fiber are coupled with the coupling apparatus by using a laser fixing part and an optical fiber fixing part of the coupling apparatus respectively; and after an optical signal transmission part of the coupling apparatus converges optical signals emitted by the laser or diverges an optical signal emitted by the laser, an emitted optical signal or emitted optical signals enter the optical fiber, where a refractive index of the optical fiber transmission part changes gradually.

With reference to the second aspect, in a first possible implementation manner, a tail end of the optical fiber is fixed within the optical fiber fixing part by using glue.

With reference to the second aspect or the first possible implementation manner of the second aspect, in a second possible implementation manner, the tail end of the optical fiber is a tangent plane with a set angle, so that an optical signal entering the optical fiber is reflected by the tangent plane, and then the optical signal is transferred in the optical fiber along a core of the optical fiber.

With reference to the second possible implementation manner of the second aspect, in a third possible implementation manner, the tangent plane at the tail end of the optical fiber is covered by a reflection layer configured to reduce an optical signal leakage.

With reference to the second aspect, in a fourth possible implementation manner, the optical signal transmission part of the coupling apparatus includes a first subpart and a second subpart wrapping the first subpart, a cross-sectional radius of the first subpart changes gradually, a refractive index becomes higher at a position closer to a center in any cross-section, and when a refractive index of the second subpart is constant, a cross-sectional radius, at a position from which optical signals are emitted, of the first subpart is decreased to converge the optical signals, so that a difference between a mode field radius of an optical signal that is emitted after passing through the coupling apparatus and a core radius of the optical fiber is less than a set threshold; or the optical signal transmission part of the coupling apparatus includes a third subpart and a fourth subpart coupled with the third subpart at a position, from which optical signals are emitted, of the third subpart, a refractive index becomes higher at a position closer to a center in any cross-section of the third subpart, a refractive index of the fourth subpart is constant, and when the refractive index of the fourth subpart is equal to a refractive index at a principal axis of the third subpart, a length of the third subpart is increased to converge the optical signals, so that a difference between a mode field radius of an optical signal that is emitted after passing through the coupling apparatus and a core radius of the optical fiber is less than a set threshold.

According to a third aspect, an optical signal transmission method is provided, where the method includes emitting, into the coupling apparatus, an optical signal emitted from a laser coupled with the apparatus for coupling a laser and an optical fiber; performing optical signal convergence or divergence when the optical signal is transferred within an optical signal transmission part of the coupling apparatus, where a refractive index of the optical signal transmission part changes gradually; and emitting, from the coupling apparatus, a converged optical signal or diverged optical signals into an optical fiber coupled by the coupling apparatus.

Beneficial effects of the present disclosure are as follows.

In the embodiments of the present disclosure, an apparatus for coupling a laser and an optical fiber is disposed between a laser and an optical fiber, where the coupling apparatus includes an optical signal transmission part whose inner refractive index changes gradually, where a refractive index becomes higher at a position closer to a principal axis of the optical signal transmission part; and the optical signal transmission part may be configured to shape an optical signal incident from the laser (including optical signal convergence or divergence), so that a mode field radius of the adjusted optical signal matches a core radius of the optical fiber, and the adjusted optical signal can be coupled into the optical fiber in high efficiency.

BRIEF DESCRIPTION OF THE DRAWINGS

The following briefly introduces the accompanying drawings required for describing the embodiments.

DETAILED DESCRIPTION

The following further describes the present disclosure in detail with reference to the accompanying drawings.

The embodiments of the present disclosure describe an apparatus for coupling a laser and an optical fiber. The coupling apparatus shapes an optical signal incident from a laser, that is, performing optical signal convergence or divergence, so that a mode field diameter of the adjusted optical signal matches a core diameter of an optical fiber, and the optical signal can be coupled into the optical fiber in high efficiency.

The following describes the apparatus for coupling a laser and an optical fiber and a transmission system and transmission method for performing optical signal transmission by using the coupling apparatus in the solutions of the present disclosure by using specific embodiments. Certainly, the solutions of the present disclosure are not limited to the following embodiments.

Embodiment 1

Figure 3:
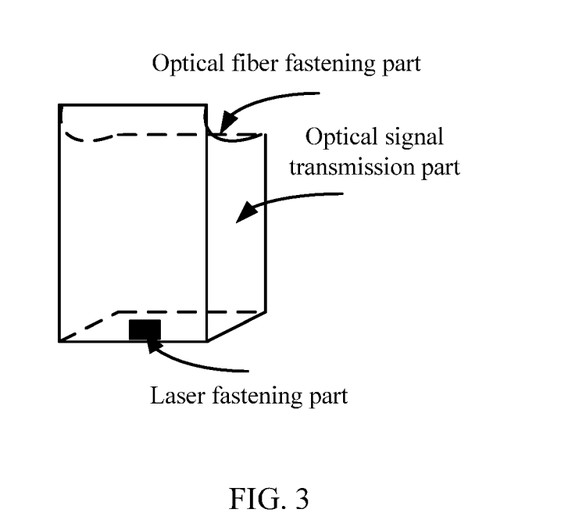
FIG. 3 is a schematic structural diagram of an apparatus for coupling a laser and an optical fiber according to Embodiment 1 of the present disclosure.

Embodiment 1 of the present disclosure describes an apparatus for coupling a laser and an optical fiber. As shown in FIG. 3, the coupling apparatus includes an optical signal transmission part, where two ends of the optical signal transmission part respectively include a laser fixing part configured to be coupled with a laser and an optical fiber fixing part configured to be coupled with an optical fiber, that a laser fixing part is coupled with a laser refers to the laser and the laser fixing part coordinate with each other, and the laser emits an optical signal to the laser fixing part; that an optical fiber fixing part is coupled with an optical fiber refers to the optical fiber fixing part and the optical fiber coordinate with each other, and an optical signal is emitted from the optical fiber fixing part and enters the optical fiber.

The coupling apparatus in Embodiment 1 is described in detail as follows.

The optical signal transmission part is a part whose inner refractive index changes gradually, where the refractive index becomes higher at a position closer to a principal axis. By means of a size design for the optical signal transmission part, the optical signal transmission part can shape an optical signal incident from the laser (including optical signal convergence or divergence), so that a mode field radius of the adjusted optical signal matches a core radius of the optical fiber, and the optical signal can be coupled into the optical fiber in high efficiency.

Preferably, the refractive index at the principal axis of the optical signal transmission part may be designed to satisfy a status in which a difference between the refractive index at the principal axis and a refractive index of a cladding is less than a threshold, that is, the refractive index at the principal axis of the optical signal transmission part is designed to be equal or close to the refractive index of the cladding as much as possible. This brings the following advantage, when an optical signal adjusted by the optical signal transmission part enters the optical fiber, reflection at a junction is minimized, so that a coupling rate obtained when the optical signal enters the optical fiber can be increased. The cladding is configured to wrap an outer part of the optical fiber, and can protect a fiber core.

Because the optical signal transmission part can perform incident optical signal convergence or divergence, that is, a mode field radius of an optical signal emitted from the optical signal transmission part may be determined according to the size design for the optical signal transmission part, when optical signal transmission is performed for a laser of a specific type and an optical fiber of a specific type, a mode field radius of an optical signal emitted from the laser machine can be adjusted when a size of a selected optical signal transmission part within a coupling apparatus is proper, so that a mode field radius of an optical signal that finally enters the optical fiber matches a core radius of the optical fiber, thereby avoiding a problem that a severe mode field mismatch occurs between the laser and the optical fiber.

The coupling apparatus shown in FIG. 3 is described by using a rectangular shape as an example. In addition, the coupling apparatus may also be in another shape, such as in a cylindrical shape, in a spherical shape, or in an elliptical shape, according to different actual application scenarios. In this embodiment of the present disclosure, no limitation is imposed on a shape of the coupling apparatus.

Preferably, the laser fixing part and the optical fiber fixing part are located at two ends of the optical signal transmission part respectively; and may be disposed vertically or transversely, provided that an optical signal incident from the laser coupled with the laser fixing part can be emitted, after passing through the coupling apparatus, into the optical fiber coupled with the optical fiber fixing part.

Preferably, the laser fixing part may be a slot, a hook, or the like; and can couple the laser and the laser fixing part together, so that a position at which an optical signal incident from the laser enters the coupling apparatus is fixed.

Preferably, the optical fiber fixing part may be a groove in a spherical shape, in an elliptical shape, or in a V shape, and the optical fiber is fixed within the groove by using glue, so as to implement coupling between the optical fiber fixing part and the optical fiber. The groove may be in a horizontal direction as shown in FIG. 3, or there may be a specific angle between the groove and a horizontal direction according to an actual application scenario. The optical fiber and the coupling apparatus may be coupled together by using the optical fiber fixing part, so that an optical signal emitted from the coupling apparatus enters the optical fiber at a fixed position.

Because both the laser and the optical fiber are coupled with the optical signal transmission part, provided that position alignment is performed once during fastening of the laser and the optical fiber, it can be ensured that an optical signal emitted by the laser can accurately enter a core of the optical fiber after passing through the coupling apparatus, without a need of performing on-site real-time alignment during every optical signal transmission. Because a communication band cannot be recognized by eye and a special alignment device is required, with a laser fixing part and an optical fiber fixing part, an alignment process can be greatly simplified, and an error that is brought due to an impact of an ambient environment in multiple alignment processes is also reduced. In addition, if the laser, the coupling apparatus, and the optical fiber still need to be packaged subsequently, a manner of fastening the laser, the coupling apparatus, and the optical fiber together can also reduce a packaging difficulty and integration costs effectively and improve application reliability.

Preferably, a refractive index of an outer surface of the optical fiber fixing part may be designed to satisfy a status in which a difference between the refractive index of the outer surface and a refractive index of a cladding is less than a threshold, that is, the refractive index of the outer surface of the optical fiber fixing part is equal or close to the refractive index of the cladding as much as possible. This brings the following advantage, because the outer surface (that is, an outer surface of a groove) of the optical fiber fixing part is in contact with the optical fiber, when an optical signal is transferred to the outer surface of the optical fiber fixing part, an adverse impact that is caused onto a coupling rate at a junction due to Fresnel reflection can be relieved if the refractive index of the outer surface of the optical fiber fixing part is equal or close to the refractive index of the cladding in contact with the outer surface.

Preferably, the coupling apparatus may be made of material, such as silicon dioxide, silicon nitride, silicon oxynitride, or other high-polymer material or polymer material, contributing to heat dissipation of a laser chip. In this embodiment of the present disclosure, no limitation is imposed on material that of which the coupling apparatus is actually made.

Preferably, during coupling apparatus manufacturing, a coupling apparatus whose refractive index changes gradually may be manufactured in an existing manner (such as a preform method or direct co-extrusion method) of manufacturing a gradient optical fiber, or may be manufactured by using an ion exchange technology or a vapor deposition method. In this embodiment of the present disclosure, no limitation is imposed on a manufacturing technique of the coupling apparatus.

It should be noted that, the optical signal involved in this embodiment of the present disclosure refers to a light field, including modulation information, emitted from a laser chip. The laser chip is excited by an electrical signal through a drive circuit, and a drive circuit related to a laser may be externally disposed, or may be fastened together with the laser chip on the apparatus for coupling a laser and an optical fiber.

The following describes in detail a structure of the optical signal transmission part of the coupling apparatus by using specific examples. It should be noted that Example 1 and Example 2 are described by using optical signal convergence as an example.

Example 1

Figure 4:
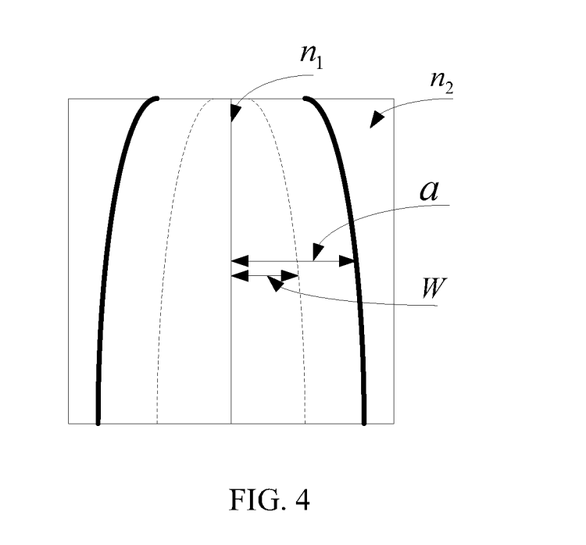
FIG. 4 is a schematic structural diagram of an inner-outer optical signal transmission part according to Embodiment 1 of the present disclosure.

As shown in FIG. 4, FIG. 4 is a schematic diagram of a structure of an inner-outer optical signal transmission part. It can be seen from FIG. 4 that, the optical signal transmission part includes a first subpart and a second subpart, where the first subpart is an inner-layer part, the second subpart is an outer-layer part, and the first subpart is wrapped in the second subpart.

The first subpart is a subpart whose refractive index changes gradually, and the refractive index becomes higher at a position closer to a principal axis, that is, the refractive index becomes higher at a position closer to a center in any cross-section.

The first subpart is in a shape of a circular truncated cone, and a cross-sectional radius of the first subpart changes gradually. Assuming that an optical signal is transferred from the bottom of the first subpart to the top, that is, a direction in which the optical signal is transferred within the first subpart is from the bottom of the first subpart to the top, if the cross-sectional radius decreases gradually, the first subpart can perform optical signal convergence; if the cross-sectional radius increases gradually, the first subpart can perform optical signal divergence.

The second subpart is a subpart whose refractive index is constant. The second subpart wraps the first subpart, so that the entire optical signal transmission part is rectangular. Certainly, no specific limitation is imposed on a shape of the first subpart and a shape of the second subpart in this embodiment of the present disclosure. The second subpart may also be in another shape, so that the entire optical signal transmission part is in a shape such as a cylinder or a sphere.

An optical signal emitted by a laser is incident from the bottom of the first subpart and is emitted from the top. To ensure that a mode field radius of the optical signal emitted from the top matches a core radius of an optical fiber, the first subpart needs to possess a capability of shaping an incident optical signal. Considering that the mode field radius obtained when the optical signal is emitted from the first subpart is related to a cross-sectional radius at an emission position of the first subpart, a larger cross-sectional radius at the emission position of the first subpart indicates a larger mode field radius obtained when the optical signal is emitted from the first subpart. Therefore, multiple coupling apparatuses can be manufactured in advance, and cross-sectional radiuses at emission positions of second subparts of all coupling apparatuses are different, so as to select a proper coupling apparatus according to a core size of an optical fiber used in an actual transmission process.

In the optical signal transmission part shown in FIG. 4, a cross-section of the first subpart decreases gradually in an optical signal transmission direction; therefore, the mode field radius of the optical signal decreases gradually, achieving a purpose of performing optical signal convergence. If the cross-section of the first subpart increases gradually in the optical signal transmission direction, the mode field radius of the optical signal increases gradually, achieving a purpose of performing optical signal divergence. The mode field radius obtained when the optical signal is emitted from the first subpart can be controlled by controlling a length of the cross-sectional radius of the first subpart. That is, if the mode field radius required when the optical signal is emitted from the first subpart is determined according to the core radius of the optical fiber, a shape parameter of the first subpart can be determined according to a proper length of the cross-sectional radius. Referring to FIG. 4, the mode field radius obtained when the optical signal is transferred in the first subpart (a thick solid line in FIG. 4) is shown by a dashed line.

A specific relationship between the mode field radius obtained when the optical signal is emitted from the first subpart and a cross-sectional radius at the emission position of the first subpart may be determined by using the following formula.

A refractive index distribution in any cross-section of the optical signal transmission part shown in FIG. 4 is:

$$n^2(r) = \begin{cases} n_1^2 \left[1 - 2\left(\frac{r}{a}\right)^t \Delta\right] & (r < a) \\ n_2^2 = n_1^2(1 - 2\Delta) & (r \geq a) \end{cases} \quad (1)$$

where $n^2$ (r) is a refractive index at a position in any cross-section of the optical signal transmission part, where a distance between the position and a center is r; α is any cross-sectional radius of the first subpart; $n_1$ is a refractive index at a principal axis of the first subpart; $n_2$ is a refractive index of the second subpart; a relative difference between refractive indexes of cross-sections is $$\Delta = \frac{n_1^2 - n_2^2}{2n_1^2};$$

and t is a refractive index distribution index in any cross-section of the first subpart, where if t is 2, it indicates that a refractive index of a cross-section is distributed in a square rate.

If a difference between $n_1$ and $n_2$ is very small, $$\Delta = \frac{n_1^2 - n_2^2}{2n_1^2} \approx \frac{n_1 - n_2}{n_1}.$$

Preferably, a difference between $n_1$ and a refractive index of a cladding is less than a threshold, and preferably, is close to the refractive index of the cladding as much as possible, so as to increase a coupling rate obtained when an optical signal enters an optical fiber.

In addition, a guided propagation mode of the optical signal in the optical signal transmission part is:

$$\beta^2 = \frac{4k_0^2}{W^2} \int_0^\infty r n^2(r) \exp\left(\frac{-2r^2}{W^2}\right) dr - \frac{2}{W^2}, \quad (2)$$

where β is a guided propagation mode; W is a mode field radius obtained after an optical signal is adjusted; and $$k_0 = \frac{2\pi}{\lambda_0},$$

where is a wavelength, in vacuum, of a light source used to adjust an optical signal.

Because $\beta^2$ is a stable value, $$\frac{d\beta^2}{dW} = 0$$

holds, and the following formula can be obtained by taking a derivative of formula (2):

$$\beta = 1 + 2k_0^2 \int_0^\infty r\left(\frac{2r^2}{W^2} - 1\right) n^2(r) \exp\left(\frac{-2r^2}{W^2}\right) dr = 0. \quad (3)$$

With reference to formula (1), when t is 2, and r<α, the following formula can be obtained by substituting $$n^2(r) = n_1^2 \left[1 - 2\left(\frac{r}{a}\right)^2 \Delta\right]$$

in formula (1) into formula (3):

$$\beta = 1 + 2k_0^2 \int_0^\infty r\left(\frac{2r^2}{W^2} - 1\right) n_1^2 \left[1 - 2\left(\frac{r}{a}\right)^2 \Delta\right] \exp\left(\frac{-2r^2}{W^2}\right) dr. \quad (4)$$

The following formula can be obtained by simplifying formula (4) by using integration by parts:

$$\beta = 1 - 2k_0^2 n_1^2 \frac{\Delta W^4}{4a^2}, \quad (5)$$

where if β=0, the following formula can be obtained:

$$1 - 2k_0^2 n_1^2 \frac{\Delta W^4}{4a^2} = 0. \quad (6)$$

Formula (6) is transformed into $$W^2 = \frac{\sqrt{2}\,a}{k_0 n_1 \sqrt{\Delta}}, \quad (7)$$

where formula (7) is a logical operation relationship between W and α, where W is a mode field radius, in a cross-section corresponding to α, of an optical signal; α in formula (3) refers to any cross-sectional radius of the first subpart; and if W herein refers to a mode field radius during emission, α herein refers to a radius of a top cross-section of the first subpart (that is, a cross-sectional radius, at a position from which an optical signal is emitted, of the first subpart).

The foregoing formula (7) is a relational expression between a cross-sectional radius of the first subpart and a mode field radius of an optical signal, but another relational expression for representing a relationship between the cross-sectional radius of the first subpart and the mode field radius of the optical signal is not limited in this embodiment of the present disclosure.

Example 2

Figure 5:
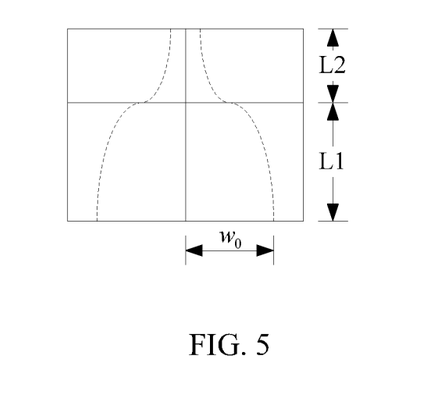
FIG. 5 is a schematic structural diagram of an upper-lower optical signal transmission part according to Embodiment 1 of the present disclosure.

As shown in FIG. 5, FIG. 5 is a schematic diagram of a structure of an upper-lower optical signal transmission part. It can be seen from FIG. 5 that the optical signal transmission part includes a third subpart and a fourth subpart, where the third subpart is a lower-layer part, the fourth subpart is an upper-layer part, and the fourth subpart is connected to the third subpart at a position, from which an optical signal is emitted, of the third subpart.

The third subpart is cylindrical, and a cross-sectional radius of the third subpart is constant.

The third subpart is a subpart whose refractive index changes gradually, and the refractive index becomes higher at a position closer to a principal axis, that is, the refractive index becomes higher at a position closer to a center in any cross-section.

The fourth subpart is a subpart whose refractive index is constant, and a refractive index of the fourth subpart is equal to a refractive index at the principal axis of the third subpart.

Preferably, a difference between the refractive index of the fourth subpart (that is, the refractive index at the principal axis of the third subpart) and a refractive index of a cladding is less than a threshold, and preferably, is close to the refractive index of the cladding as much as possible, so as to increase a coupling rate obtained when an optical signal enters an optical fiber.

The fourth subpart is also cylindrical, so that the entire optical signal transmission part is cylindrical. Certainly, in this embodiment of the present disclosure, no specific limitation is imposed on a shape of the third subpart and a shape of the fourth subpart. For example, the third subpart and the fourth subpart are cuboid, so that the entire optical signal transmission part is also cuboid.

An optical signal emitted by a laser is incident from the bottom of the third subpart, is emitted from the top of the third subpart into the bottom of the fourth subpart, and finally, is emitted from the top of the fourth subpart into an optical fiber. To ensure that a mode field radius of the optical signal emitted from the top of the fourth subpart matches a core radius of the optical fiber, the third subpart needs to possess a capability of shaping an incident optical signal. Considering that the mode field radius obtained when the optical signal is finally emitted is related to a length of the third subpart, a longer length of the third subpart indicates a smaller mode field radius obtained when the optical signal is emitted from the third subpart, or a smaller mode field radius obtained when the optical signal is emitted from the fourth subpart. Therefore, a proper coupling apparatus whose third subpart has a proper length can be selected according to a core size of an optical fiber used in an actual transmission process.

For example, a length threshold of the third subpart is determined according to an experiment, where the threshold is a critical value. If a length of the third subpart is greater than the threshold, the third subpart may perform optical signal convergence, and a longer length of the third subpart indicates a higher degree of optical signal convergence; if a length of the third subpart is less than the threshold, the third subpart may perform optical signal divergence, and a shorter length of the third subpart indicates a higher degree of optical signal divergence.

A relationship between the mode field radius obtained when the optical signal is emitted from the third subpart and the length of the third subpart may be:

$$W = \frac{a_0 w_0}{n_2 g \left[\sin^2(gL_1) + \left(\frac{a_0}{n_2 g}\right)^2 \cos^2(gL_1)\right]^{1/2}}, \quad (8)$$

where $L_1$ is the length of the third subpart; W is the mode field radius obtained when an optical signal is emitted from the third subpart; $w_0$ is a mode field radius obtained when an optical signal enters the third subpart (that is, the mode field radius of an optical signal emitted by a laser);

$$a_0 = \frac{\lambda}{\pi w_0^2}, \text{ where } \lambda = \frac{\lambda_0}{n_2},$$

and $\lambda_0$ is a wavelength, in vacuum, of a light source used to modulate an optical signal; g is a focusing parameter, and $n_2$ is a refractive index of the fourth subpart, that is, a refractive index at a principal axis of the third subpart.

In FIG. 5, optical signal convergence is used as an example for description. An optical signal incident from the laser is adjusted by the third subpart and then is focused on the top of the fourth subpart (whose length is L2) for emission, as shown in a dashed line part in FIG. 5. Because the fourth subpart is a part whose refractive index is constant, even if there is no fourth subpart, an optical signal can be directly transferred to an optical fiber after being adjusted by the third subpart. In consideration of a proper size of a coupling apparatus and a designed size of the third subpart, if a shorter length is designed for the third subpart, a fourth subpart with a proper length can be designed.

Preferably, an inside of the third subpart shown in FIG. 5 may also be designed according to an inner-outer structure described in Example 1.

It should be noted that "first", "second", "third", and "fourth" in the first subpart, the second subpart, the third subpart, and the fourth subpart that are involved in Example 1 and Example 2 are used to distinguish all subparts and do not intend to impose limitation on an actual structure or size of a subpart.

Embodiment 2

Figure 6:
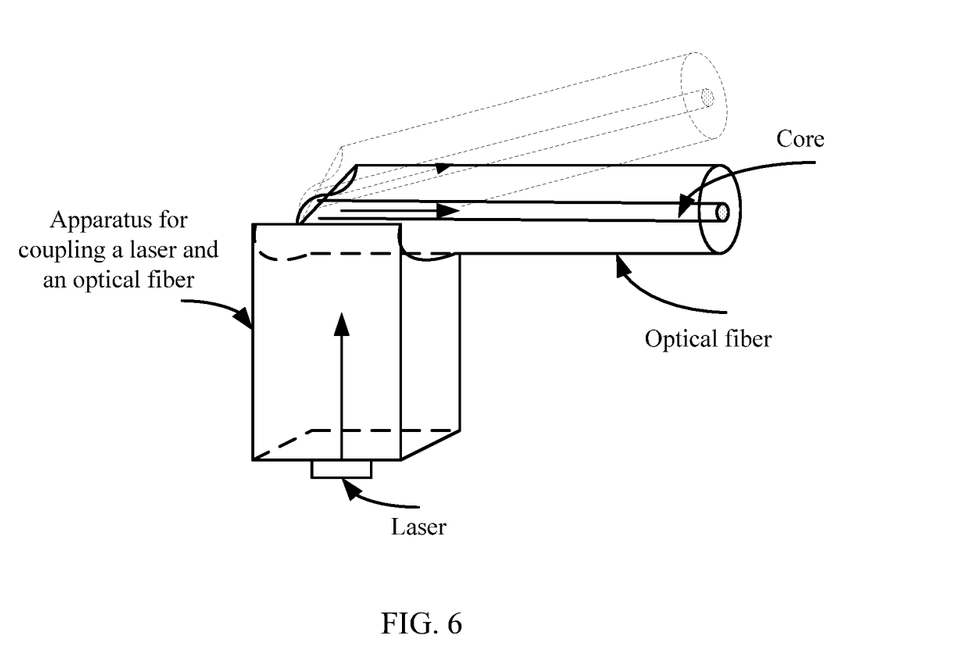
FIG. 6 is a schematic structural diagram of a transmission system according to Embodiment 2 of the present disclosure.

Based on the apparatus for coupling a laser and an optical fiber described in Embodiment 1, an optical signal transmission system is described in Embodiment 2 of the present disclosure. As shown in FIG. 6, the transmission system includes the apparatus for coupling a laser and an optical fiber, a laser, and an optical fiber.

The laser and the optical fiber are coupled with the coupling apparatus by using a laser fixing part and an optical fiber fixing part of the coupling apparatus respectively. After an optical signal transmission part of the coupling apparatus converges optical signals emitted by the laser or diverges an optical signal emitted by the laser, an emitted optical signal or emitted optical signals enter the optical fiber, where a refractive index of the optical fiber transmission part changes gradually.

Certainly, according to a core radius of the optical fiber, a coupling apparatus of a proper structure and in a proper size may be selected according to descriptions in Example 1 or Example 2, so that a difference between a mode field radius of an optical signal that is emitted after being adjusted by the coupling apparatus and a core radius of the optical fiber is less than a set threshold, that is, the mode field radius of the emitted optical signal matches the core radius of the optical fiber.

For example, if the coupling apparatus uses the structure in Example 1, optical signal convergence may be performed by decreasing a cross-sectional radius, at a position from which an optical signal is emitted, of the first subpart, or optical signal divergence may be performed by increasing a cross-sectional radius, at a position from which an optical signal is emitted, of the first subpart, so that a difference between a mode field radius of an optical signal that is emitted after passing through the coupling apparatus and a core radius of an optical fiber is less than the set threshold.

If the coupling apparatus uses the structure in Example 2, optical signal convergence is performed by increasing a length of the third subpart, or optical signal divergence is performed by decreasing a length of the third subpart, so that a difference between a mode field radius of an optical signal that is emitted after passing through the coupling apparatus and a core radius of an optical fiber is less than the set threshold.

With reference to the case in FIG. 6, the laser and the coupling apparatus are fastened together by using a slot, a hook (that is, the laser fixing part), or the like, and an optical signal vertically enters the coupling apparatus. A cylindrical tail end of the optical fiber is horizontally fastened within a groove of the coupling apparatus (that is, the optical fiber fixing part) by using glue. In this case, an optical signal in a vertical direction is emitted from the coupling apparatus, but a core direction of the optical fiber is a horizontal direction. To ensure that an optical signal enters a core of the optical fiber, the tail end of the optical fiber can be designed to be a tangent plane with a set angle (for example, an angle $\theta$), so that an optical signal enters the tangent plane with the angle $\theta$ at the tail end of the optical fiber after passing through a cladding. Reflection happens on the tangent plane, so that an optical signal transmission direction changes, and an optical signal can be transferred in the optical fiber along the core of the optical fiber.

In a case shown in FIG. 6, a transmission direction of an emitted optical signal is vertical to a core direction of an optical fiber, and the angle $\theta$ may be designed to be 45 degrees. In this case, an optical signal in a vertical direction may be reflected exactly along a horizontal direction. Certainly, when an angle between the core direction of the optical fiber and the transmission direction of the emitted optical signal changes, the angle $\theta$ also changes correspondingly. For example, when a tail end of the optical fiber is vertically fastened within the groove of the coupling apparatus (that is, the angle between the core direction of the optical fiber and the transmission direction of the emitted optical signal is 0 degree), the angle $\theta$ is 0 degree.

Preferably, the tangent plane at the tail end of the optical fiber may be further covered by a reflection layer, where the reflection layer may be a metal reflection layer or may be a reflection layer made of other material, and may be a single-layer reflection layer, a Bragg reflection mirror including multiple layers of films, a reflection grating with an end surface etched, or the like. The reflection layer is used to reduce an optical signal leakage happening on a surface of the groove, so that optical signals are reflected into the core of the optical fiber as many as possible, and an optical signal coupling rate is increased.

The optical fiber involved in Embodiment 2 of the present disclosure may be a standard single-mode optical fiber for receiving, or may be an optical fiber of another type. The standard single-mode optical fiber includes, but is not limited to, single-mode optical fibers G.652, G.653, G.654 G.655, and G.656 that are specified by the Telecommunication Standardization Sector of the International Telecommunication Union (ITU-T), single-mode optical fibers B1.1, B1.2, B1.3, B2, and B4 that are specified by the International Electrotechnical Commission (IEC), and other single-mode optical fibers. Material for manufacturing an optical fiber includes, but is not limited to, silicon dioxide, a corresponding polymer, and the like.

The laser involved in Embodiment 2 of the present disclosure is classified into an 850 nanometer (nm)-wavelength laser, a 1310 nm-wavelength laser, a 1550 nm-wavelength laser, and the like according to different wavelengths of emitted optical waves.

Embodiment 3

Figure 7:
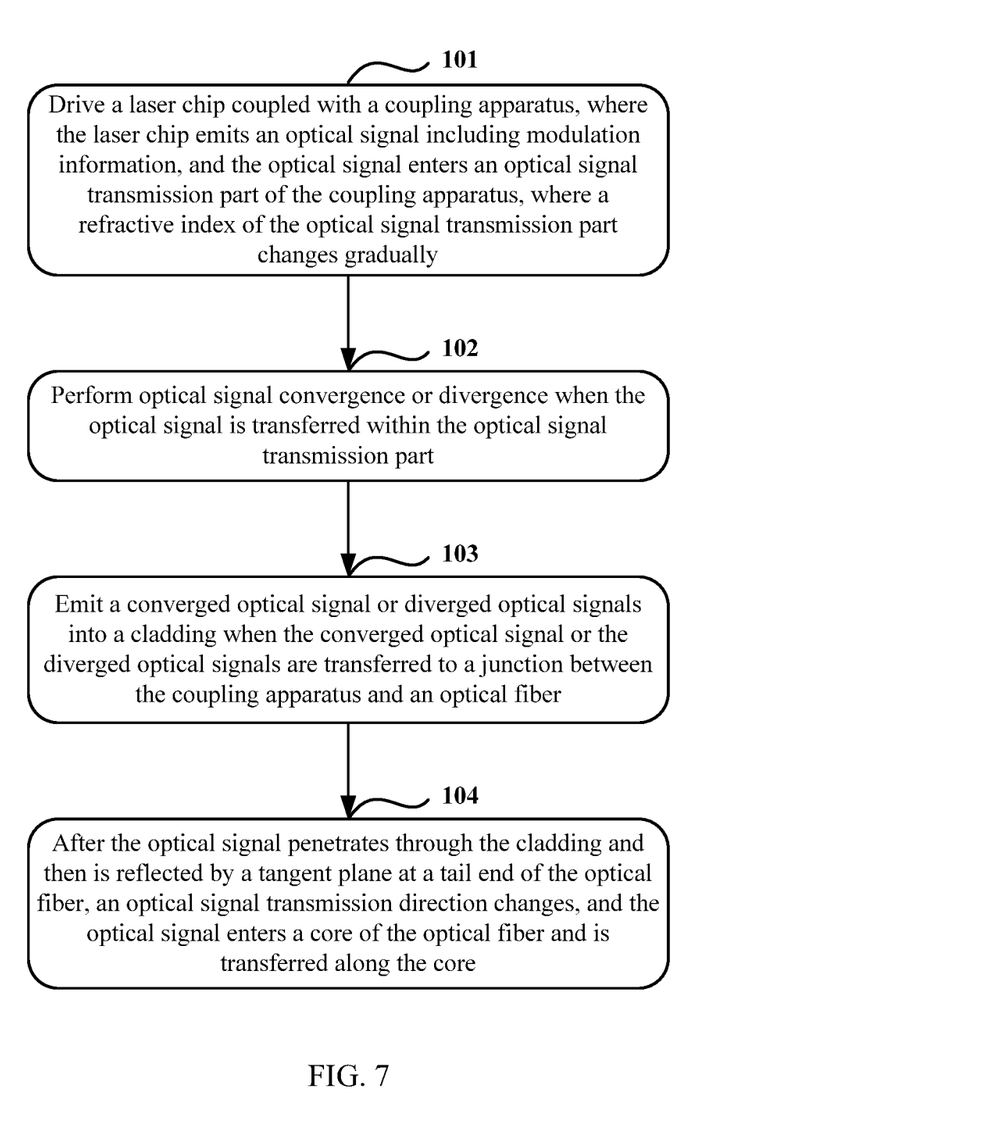
FIG. 7 is a schematic flowchart of steps of a transmission method according to Embodiment 3 of the present disclosure.

Embodiment 3 of the present disclosure describes an optical signal transmission method that is based on the transmission system described in Embodiment 2. As shown in FIG. 7, the method includes the following steps.

Step 101: Drive a laser chip coupled with a coupling apparatus, where the laser chip emits an optical signal including modulation information, and the optical signal enters an optical signal transmission part of the coupling apparatus, where a refractive index of the optical signal transmission part changes gradually.

Step 102: Perform optical signal convergence or divergence when the optical signal is transferred within the optical signal transmission part.

Step 103: Emit a converged optical signal or diverged optical signals into a cladding when the converged optical signal or the diverged optical signals are transferred to a junction between the coupling apparatus and an optical fiber.

Step 104: After the optical signal penetrates through the cladding and then is reflected by a tangent plane, with an angle θ, of a tail end of the optical fiber (the tangent plane is covered by a reflection layer), an optical signal transmission direction changes, and the optical signal enters a core of the optical fiber and is transferred along the core, so as to complete an optical signal transmission process.

Figure 8:
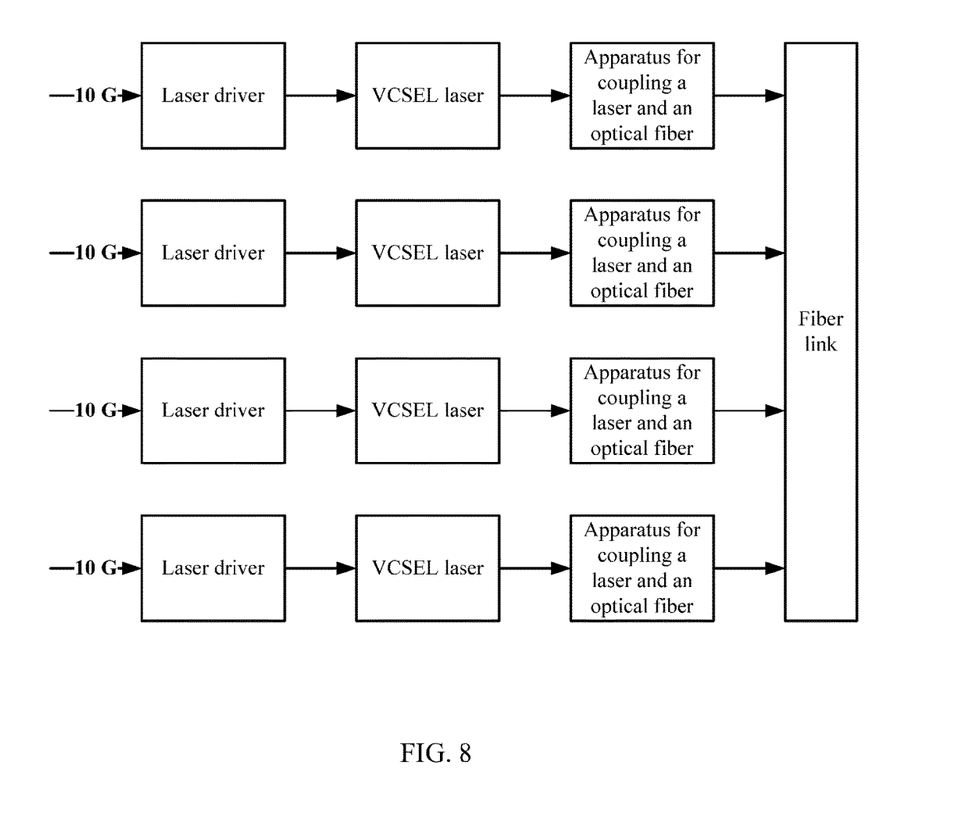
FIG. 8 is a schematic diagram of an application scenario of a transmission method according to Embodiment 3 of the present disclosure.

A scenario shown in FIG. 8 is used as an example. Assuming that four 10 G electrical signals are loaded to a VCSEL laser by using a driver of a laser, the electrical signals are modulated in a direct modulation scheme, optical signals are output, and after a mode field radius of the optical signals is adjusted by the coupling apparatus, the shaped optical signals enter the optical fiber and are transferred in a fiber link. After being transferred for a specific distance, the optical signals are received by a detector, and output current undergoes subsequent processing such as amplification to obtain the electrical signals by means of separation, thereby completing an entire electrical-optical-electrical conversion transmission process.

According to the solution in this embodiment of the present disclosure, a designed coupling apparatus uses a structure that a refractive index changes gradually, a mode field of an incident optical signal is shaped (including convergence or divergence), and finally, an emergent optical signal is adjusted, so that a mode field radius of the shaped optical signal matches a core radius of an optical fiber, and a problem of a severe mode field mismatch brought by a great difference between the mode field radius of the optical signal emitted by a laser and a core size of the optical fiber is avoided, and the optical signal can be coupled into the optical fiber in high efficiency. Using a case shown in FIG. 2 as an example, a mode field diameter of light emitted from the VCSEL greatly differs from a core diameter of a single-mode optical fiber, and a severe mode field mismatch exists between the VCSEL and the single-mode optical fiber. According to the solution in this embodiment of the present disclosure, the light emitted by the VCSEL can be converged, so that a mode field diameter of an optical signal emitted from the coupling apparatus matches a core diameter of the single-mode optical fiber, and the optical signals emitted from the VCSEL can be coupled into the optical fiber in high efficiency.

In addition, a refractive index at a principal axis of the coupling apparatus and a refractive index at a junction between the coupling apparatus and an optical fiber are close to a refractive index of a cladding, so that reflection at the junction is minimized, further improving coupling efficiency; moreover, nearly all incident optical signals may be reflected into the core of the optical fiber by a reflection layer covered at the tail end of the optical fiber, further improving coupling rate. Besides, the laser, the optical fiber, and the coupling apparatus are coupled together, which not only reduces an error that is brought because a device is mounted for multiple times, but also reduces encapsulation difficulty and integration costs.

Although some exemplary embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, persons skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. An apparatus for coupling a laser and an optical fiber, comprising:
a laser fixing part configured to be coupled with the laser;
an optical fiber fixing part configured to be coupled with the optical fiber; and
an optical signal transmission part comprising two ends,
wherein the laser fixing part and the optical fiber fixing part are respectively disposed at the two ends of the optical signal transmission part,
wherein a refractive index of the optical signal transmission part changes gradually,
wherein the refractive index of the optical signal transmission part becomes higher at a position closer to a principal axis to output an optical signal incident from the laser coupled to the laser fixing part, and then emit the optical signal into the optical fiber,
wherein the optical signal transmission part comprises a first subpart and a second subpart,
wherein the first subpart is in a shape of a circular truncated cone,
wherein the second subpart wraps around the first subpart,
wherein a cross-sectional radius of the first subpart changes gradually,
wherein a refractive index becomes higher at a position closer to a center in any cross-section, and
wherein a refractive index of the second subpart is constant.

2. The coupling apparatus according to claim 1, wherein a difference between a refractive index of an outer surface of the optical fiber fixing part and a refractive index of a cladding used to wrap the optical fiber is less than a threshold.

3. The coupling apparatus according to claim 1, wherein when the cross-sectional radius of the first subpart decreases gradually in an optical signal transmission direction, the first subpart is configured to perform optical signal convergence, and wherein when the cross-sectional radius of the first subpart increases gradually in an optical signal transmission direction, the first subpart is configured to perform optical signal divergence.

4. The coupling apparatus according to claim 3, wherein a relationship between a cross-sectional radius, at a position from which an optical signal is emitted, of the first subpart and a mode field radius obtained when the optical signal is emitted from the first subpart $$W^2 = \frac{\sqrt{2}\,a}{k_0 n_1 \sqrt{\Delta}},$$

wherein α is any cross-sectional radius of the first subpart, W is a mode field radius, in a cross-section corresponding to α, of an optical signal, $$k_0 = \frac{2\pi}{\lambda_0},$$

wherein $\lambda_0$ is a wavelength, in vacuum, of a light source used to modulate an optical signal, $n_1$ is a refractive index at a principal axis of the first subpart, and $$\Delta = \frac{n_1^2 - n_2^2}{2n_1^2},$$

and
wherein $n_2$ is a refractive index of the second subpart.

5. The coupling apparatus according to claim 1, wherein the optical signal transmission part comprises a third subpart and a fourth subpart, wherein the fourth subpart is connected to the third subpart at a position, from which an optical signal is emitted, of the third subpart, and wherein a refractive index becomes higher at a position closer to a center in any cross-section of the third subpart, a refractive index of the fourth subpart is constant, and the refractive index of the fourth subpart is equal to a refractive index at a principal axis of the third subpart.

6. The coupling apparatus according to claim 5, wherein when a length of the third subpart is greater than a threshold, the third subpart is configured to perform optical signal convergence, and a longer length of the third subpart indicates a higher degree of optical signal convergence, and wherein when a length of the third subpart is less than a threshold, the third subpart is configured to perform optical signal divergence, and a shorter length of the third subpart indicates a higher degree of optical signal divergence.

7. The coupling apparatus according to claim 6, wherein a relationship between the length of the third subpart and a mode field radius obtained when an optical signal is emitted from the fourth subpart is:

$$W = \frac{a_0 w_0}{n_2 g \left[ \sin^2(gL_1) + \left( \frac{a_0}{n_2 g} \right)^2 \cos^2(gL_1) \right]^{1/2}},$$

wherein $L_1$ is the length of the third subpart, W is the mode field radius obtained when the optical signal is emitted from the fourth subpart, $w_0$ is a mode field radius obtained when the optical signal enters the third subpart, $$a_0 = \frac{\lambda}{\pi w_0^2},$$

and
wherein $$\lambda = \frac{\lambda_0}{n_2},$$

$\lambda_0$ is a wavelength, in vacuum, of a light source used to modulate an optical signal, and $n_2$ is the refractive index at the principal axis of the third subpart, and g is a focusing parameter.

8. An optical signal transmission system, comprising:
a laser;
an optical fiber; and
an apparatus for coupling the laser and the optical fiber, wherein the apparatus comprises a laser fixing part, an optical fiber fixing part, and an optical signal transmission part,
wherein the laser is coupled with the apparatus using the laser fixing part,
wherein the optical fiber is coupled with the apparatus using the optical fiber fixing part,
wherein the optical signal transmission part comprises two ends,
wherein the laser fixing part and the optical fiber fixing part are respectively disposed at the two ends of the optical signal transmission part,
wherein a refractive index of the optical signal transmission part changes gradually,
wherein the refractive index of the optical signal transmission part becomes higher at a position closer to a principal axis to output an optical signal incident from the laser coupled to the laser fixing part, and then emit the optical signal into the optical fiber,
wherein the optical signal transmission part comprises a first subpart and a second subpart,
wherein the first subpart is in a shape of a circular truncated cone,
wherein the second subpart wraps around the first subpart,
wherein a cross-sectional radius of the first subpart changes gradually,
wherein a refractive index becomes higher at a position closer to a center in any cross-section, and
wherein a refractive index of the second subpart is constant.

9. The system according to claim 8, wherein a tail end of the optical fiber is fixed within the optical fiber fixing part by using glue.

10. The system according to claim 8, wherein the tail end of the optical fiber is a tangent plane with a set angle to make an optical signal entering the optical fiber reflected by the tangent plane, and then transferred in the optical fiber along a core of the optical fiber.

11. The system according to claim 10, wherein the tangent plane at the tail end of the optical fiber is covered by a reflection layer configured to reduce an optical signal leakage.

12. The system according to claim 8, wherein the optical signal transmission part of the coupling apparatus comprises a third subpart and a fourth subpart coupled with the third subpart at a position, from which optical signals are emitted, of the third subpart, a refractive index becomes higher at a position closer to a center in any cross-section of the third subpart, a refractive index of the fourth subpart is constant, and when the refractive index of the fourth subpart is equal to a refractive index at a principal axis of the third subpart, a length of the third subpart is increased to converge the optical signals, so that a difference between a mode field radius of an optical signal that is emitted after passing through the coupling apparatus and a core radius of the optical fiber is less than a set threshold.

13. A method for performing optical signal transmission, comprising:
emitting, into a coupling apparatus, an optical signal emitted from a laser coupled with an apparatus for coupling a laser and an optical fiber;
performing optical signal convergence or divergence when the optical signal is transferred within an optical signal transmission part of the coupling apparatus, wherein a refractive index of the optical signal transmission part changes gradually; and
emitting, from the coupling apparatus, a converged optical signal or diverged optical signals into the optical fiber coupled by the coupling apparatus, wherein the optical signal transmission part comprises a first subpart and a second subpart,
wherein the first subpart is in a shape of a circular truncated cone,
wherein the second subpart wraps around the first subpart,
wherein a cross-sectional radius of the first subpart changes gradually,
wherein a refractive index becomes higher at a position closer to a center in any cross-section, and
wherein a refractive index of the second subpart is constant.

\* \* \* \* \*

UNITED STATES PATENT AND TRADEMARK OFFICE
CERTIFICATE OF CORRECTION

PATENT NO.       : 9,851,514 B2
APPLICATION NO.  : 15/222462
DATED            : December 26, 2017
INVENTOR(S)      : Can Zhang It is certified that error appears in the above-identified patent and that said Letters Patent is hereby corrected as shown below:

In the Claims

Column 16, Lines 48-65, through Column 17, Lines 1-10, Claim 4 should read:
4. The coupling apparatus according to claim 3, wherein a relationship between a cross-sectional radius, at a position from which an optical signal is emitted, of the first subpart and a mode field radius obtained when the optical signal is emitted from the first subpart is:

$$W^2 = \frac{\sqrt{2}a}{k_0 n_1 \sqrt{\Delta}},$$

wherein $a$ is any cross-sectional radius of the first subpart, $W$ is a mode field radius, in a cross-section corresponding to $a$, of an optical signal, $$k_0 = \frac{2\pi}{\lambda_0},$$

wherein $\lambda_0$ is a wavelength, in vacuum, of a light source used to modulate an optical signal, $n_1$ is a refractive index at a principal axis of the first subpart, and $$\Delta = \frac{n_1^2 - n_2^2}{2n_1^2},$$

and
   wherein $n_2$ is a refractive index of the second subpart.

Signed and Sealed this
Twenty-ninth Day of May, 2018

Andrei Iancu
*Director of the United States Patent and Trademark Office*